United States Patent Office 3,110,394
Patented Nov. 12, 1963

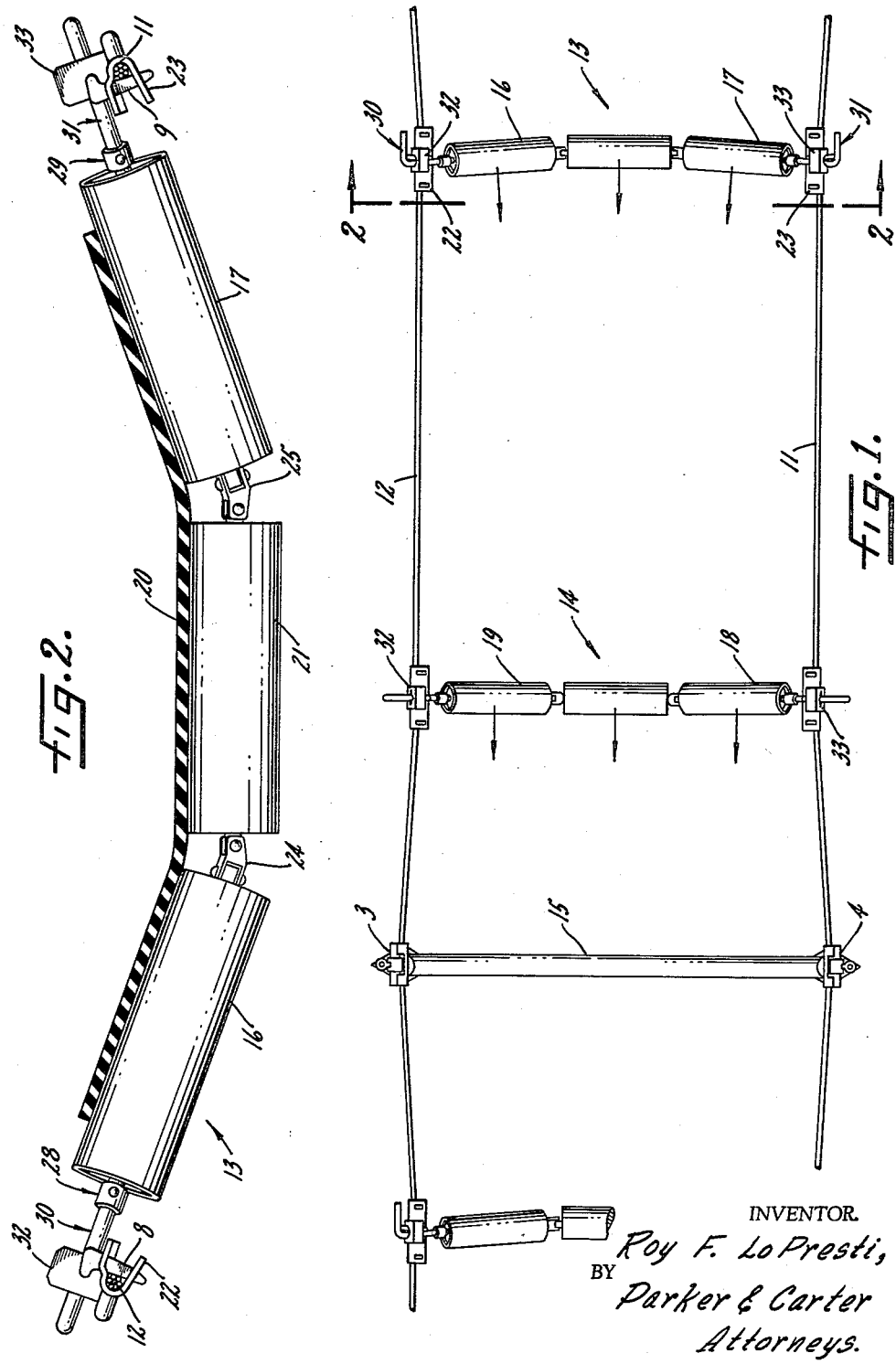

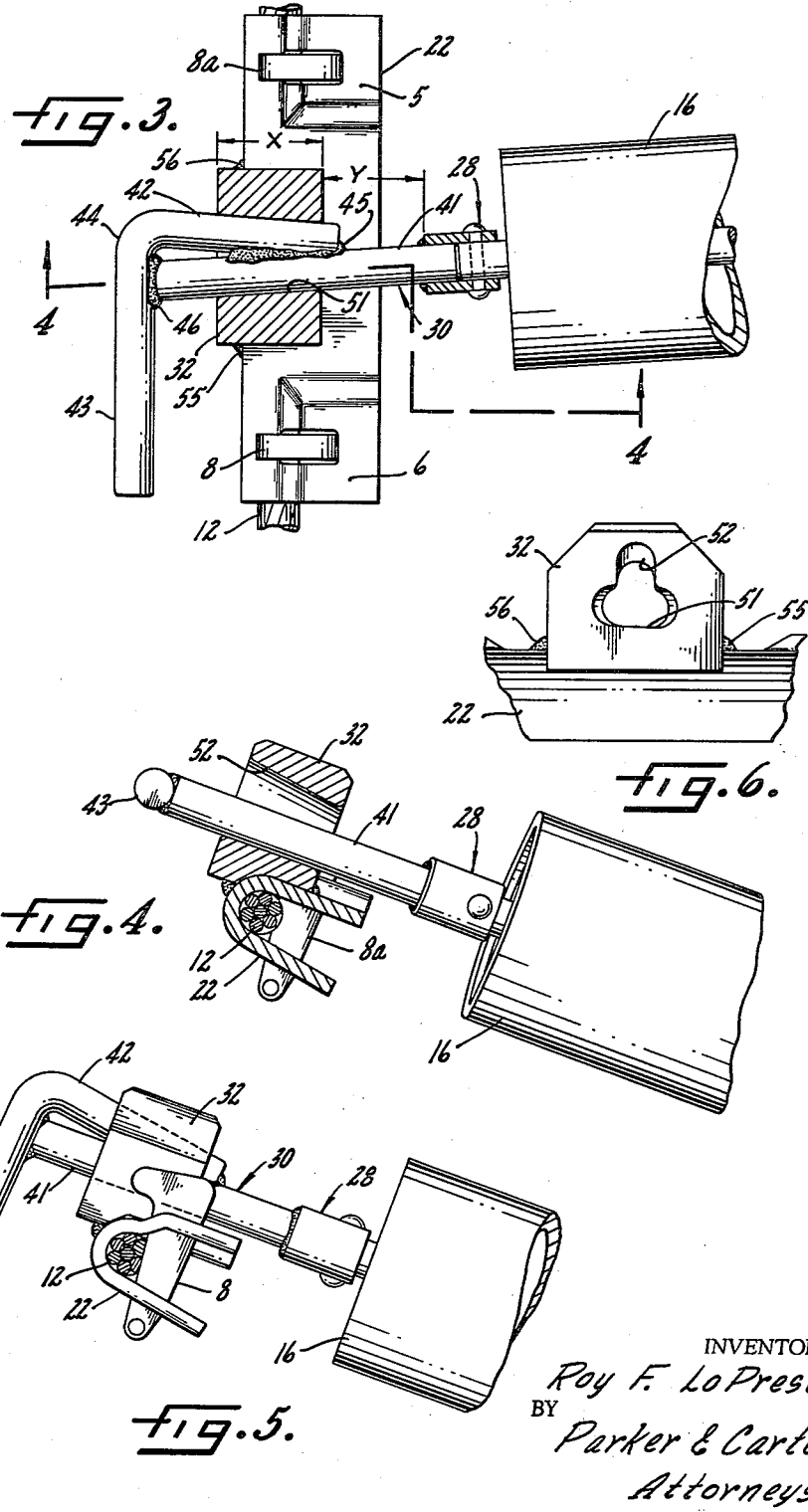

3,110,394
REVERSIBLE TRAINING TROUGHING
IDLER ASSEMBLY
Roy F. Lo Presti, Chicago, Ill., assignor to Goodman
Manufacturing Company, Chicago, Ill., a corporation
of Illinois
Filed Feb. 16, 1962, Ser. No. 173,644
8 Claims. (Cl. 198—192)

This invention relates to a troughing idler assembly for a wire rope sideframe conveyor; in particular, it relates to a troughing assembly wherein the wing rollers may be repositioned.

An object of this invention is a troughing idler assembly which can be reversed from a downstream position to an upstream position.

Another object is a troughing idler assembly wherein wing roller positions may be reversed without dismantling the assembly.

Another object is a troughing idler assembly having an extending member which is easily engaged and disengaged with elongated connectors.

Another object is a troughing idler assembly which may be reversed in training position by repositioning an extension from the wing rollers on the elongated connectors.

Another object is a modified extending member from the wing roller which is selectively seated in various positions on the elongated connector.

Another object is an elongated connector having contoured receiving means to hold an extending member from the wing rollers in different positions.

Another object is a troughing idler assembly wherein an extension from the wing rollers may be manipulated to position the wing rollers in a downstream training position, in an upstream training position and in a neutral position.

Another object is a coacting seat on an elongated connector to receive and hold an extending member from the wing rollers in various positions.

Another object is a troughing idler assembly having an extending member with a modified portion adapted to removably engage a contoured passageway on the elongated connector.

Another object is an extending member from the wing roller of the troughing idler assembly which has a diverging limb to permit removable seating of said extending member in a passageway contoured to provide various positions for the wing rollers.

The foregoing objects and other objects are now attained by the invention which will be disclosed in detail and which is illustrated in the accompanying drawings wherein:

FIGURE 1 is a top plan view of a portion of a wire rope sideframe conveyor,

FIGURE 2 is a view along line 2—2 of FIGURE 1,

FIGURE 3 is a top view partially in cross section of the extending member and the elongated connector, FIGURE 4 is a view along line 4—4 of FIGURE 3, FIGURE 5 is a side view of the extending member and elongated connector, and FIGURE 6 is an end view of the holding means in the elongated connector.

Like numerals in the various figures refer to the same structures.

FIGURE 1 shows a portion of a wire rope sideframe conveyor wherein troughing idler assemblies such as at 13 and 14 are suspended between lateral wire ropes 11 and 12. Along the length of the conveyor are found support stands 3 and 4 connected by a crossbrace 15. The troughing idler assembly 13 is shown trained in a downstream direction as indicated by the arrows and the handle position of extending members 30, 31. The troughing idler assembly 14 is shown in a nontraining or neutral position as indicated by the handle positions of extending members 31 and 32 and the noncanted position of the wing rollers 18 and 19.

The trained troughing idler assembly 13 has wing rollers 16 and 17 canted in a downstream direction as shown. Such a position of the wing rollers is customary in order to train the conveying reach of an endless belt in a traveling direction which maintains the belt more or less centrally placed on the troughing idler assemblies. Such a canting of the wing rollers has been found useful because each roller exerts a force upon a belt surface when it contacts in the direction perpendicular to the axis of the roller, and the belt will retrain if one roller contacts more belt because it will thereby exert a greater inward lateral force.

In FIGURE 2, troughing idler assembly 13 is seen with a conveying reach 20 of an endless belt riding on center roller 21 and wing rollers 16, 17. The rollers rotate about dead shafts, and the inner ends of the wing roller shafts are shown articulated to the ends of the center roller shaft by links 24 and 25. In the particular embodiment shown, the inner ends of the wing roller shafts are shown articulated to the links so that horizontal movement is permitted, and the ends of the center roller shaft are articulated to links so that vertical movement is permitted. It will be understood that other articulations are possible to permit other independent and combined movements of the rollers. The outer ends of the wing roller shafts are fixed by collar and pin assemblies 28 and 29 to extending members 30 and 31, which extending members are respectively seated in blocks 32 and 33. The blocks are secured to elongated connectors 22 and 23 by welds 55 and 56 or the like. The elongated connectors are generally U-shaped saddle supports which engage wire ropes 11 and 12. Locking pins or wedges 8 and 8a extend through aligned apertures in the opposed arms of the U-shaped elongated connectors to tightly engage the wire ropes.

The placement of the extending member and the elongated connector can be best seen in FIGURE 3 wherein the extending member 30 is seen as having a more or less straight limb 41 and an angular limb 44 secured to the tip of limb 41 by a weld 46 and to the shank of limb 41 by weld 45. The angular limb 44 forms less than a 90 degree angle so that an asymmetrical diverging portion is obtained between side 42 and the coextensive segment of limb 41. Side 43 of the angular limb 44 is generally parallel to and spaced from the elongated connector 22 to thereby provide a convenient grasping handle. The elongated connector 22 has a modified surface in that raised portions 5 and 6 are present at the place indicated. Such a modification in the top surface of the elongated connector permits facile insertion and withdrawal of the locking pins or wedges 8 and 8a to tightly engage the wire rope 12 within the elongated connector 22.

The asymmetrical diverging portion formed by the straight limb 41 and the side 42 of the angular limb is removably seated in a contoured slot or passageway in the block 32. This contoured passageway is seen in FIGURE 6 and is in the form of an inverted T, or may be considered as having a lateral bore 51 and a longitudinal bore 52 which merge into a common passageway. The lateral bore 51 is inwardly tapered as seen in FIGURE 3 so that the diverging portion of the extending member is firmly wedged therein when fully seated. The longitudinal bore 52 of the passageway is downwardly tapered as shown in FIGURE 4 so that the diverging portion is firmly wedged in the passageway when seated, as shown in FIGURE 5.

The asymmetrical diverging portion of the extending member is securely seated in the passageway of block 32 and when it is seated as shown in FIGURE 3, the wing roller 16 is canted inwards or is in a training position for downstream conveyance of the endless belt. This would correspond to the position of troughing idler assembly 13 in FIGURE 1. The diverging portion of the extending connector can be withdrawn from the lateral bore 51 in the passageway of block 32 by grasping side 43 of the angular limb and pulling the extending connector outwards until the diverging portion no longer sits in the lateral bore 51 in block 32. The length Y in FIGURE 3 should be longer than the length X so that the diverging portion can be completely withdrawn from the block. The extending member can be then turned a full 180 degrees and the diverging portion can be reseated in the passageway of the block. This results in reversing the placement of side 42 and limb 41 in the passageway or lateral bore 51 of block 32, and this reversed placement of the asymmetrical diverging portion will cant the wing roller 16 in an opposite direction, that is, the wing rollers will be canted from a downstream direction to an upstream direction. The wing rollers will, of course, respond to such a 180 degree change of position because the end of the limb 41 is securely fixed to the outer end of the wing roller shaft by the collar and pin assembly 28.

The diverging portion of the extending connector may also be seated in nontraining or neutral position by engaging side 42 of the angular limb 44 in the longitudinal bore 52 in block 32, as shown in FIGURE 5. This will place the wing rollers in a noncanted position, as indicated by troughing assembly 14 in FIGURE 1.

The use and operation of my invention are as follows:

A wire rope sideframe conveyor will have a plurality of roller assemblies suspended from generally parallel flexible wire ropes to form a bed for a flexible conveyor belt. When the belt travels downstream, it is desired that all or a selected number of the roller assemblies have their wing rollers canted inwards towards the direction of travel to thereby train the conveying reach of the endless belt.

The inward cant of the wing rollers is provided by having an extending member from the wing rollers connected properly to the elongated connectors. The extending members are connected to the outer ends of the wing roller shaft by a securely fixed collar and sleeve assembly 28 or equivalent means. The extending member has a straight limb 41 and an angular limb 44 with side 43 parallel and spaced from the elongated connector and side 42 forming an asymmetrical diverging portion with a coextensive segment of straight limb 41. The diverging portion of the extending member is securely seated in a contoured passageway which is formed from an inwardly tapered and lateral bore 51 joining a downwardly tapered and longitudinal bore 52. The tapered portion is wedged tightly in the inwardly tapered lateral bore 51 for both downstream and upstream travel. In a particular sideframe conveyor system, it may not be necessary nor desired to cant the wing rollers of all the troughing idler assemblies and therefore some of the assemblies may be retained in nontraining or neutral position. The wing rollers will be placed in a nontraining position by having the diverging portion of the extending member securely engage the inwardly tapered and longitudinal bore 52 in the block 32. In such a position, side 43 of angular limb 44 will point generally towards the ground or floor on which the sideframe conveyor is constructed.

It may be desired to reverse the direction of belt travel in an upstream direction rather than downstream direction. This reversal of direction may be desired in order to carry personnel or tools into the mine whereas the downstream direction is normally provided for conveying coal out of the mine. When the direction of the belt is reversed, it is, of course, desirable to continue the training of the belt by inwardly canting the wing rollers in the new direction of belt travel. This is done by having a worker grasp side 43 of angular limb 44 and withdraw the diverging portion of the extending connector from the contoured passageway in block 32. This may be done in single steps of withdrawing the diverging portion from the block on one side, and then withdrawing the diverging portion from the block on the other side of the troughing assembly. The operation may also be performed simultaneously by having workers on both sides of the roller assembly grasp side 43 of the angular limb 44 and withdraw the diverging portions from the contoured passageways in the blocks. The diverging portion is easily removed from the contoured passageway because the length of a straight limb 41 between the collar assembly 28 and the juncture point of side 42 with limb 41 is longer than the length measured from this juncture point to a point where the diverging portion projects out of the passageway in block 32. By turning side 43 of angular limb 44 a full 180 degrees and then replacing the diverging portion in the contoured passageway, the wing rollers are now canted in proper training position for the new upstream direction of belt travel.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. In a wire rope sideframe conveyor having a center roller and wing rollers suspended between generally parallel wire ropes, the combination which includes:
   elongated connectors engaging the wire ropes,
   a block fixed to the top of each elongated connector,
   a contoured passageway in each block,
   an extending member connected to the outer end of each wing roller shaft,
   a diverging portion on each extending member, said portion removably seated in the passageway of the block and said passageway further contoured to selectively seat the diverging portion so that the wing rollers may be positioned in downstream, upstream and neutral positions.

2. The sideframe conveyor of claim 1 further characterized in that the extending member is securely fixed to the outer end of the wing roller shaft.

3. The sideframe conveyor of claim 1 further characterized in that the extending member with diverging portion is asymmetrical.

4. The apparatus of claim 1 further characterized in that the length of the non-diverging portion of the extending member is longer than the diverging portion seated in the contoured passageway of the block.

5. The apparatus of claim 1 further characterized in that the extending member has grasping means thereon to permit withdrawal of the diverging portion from the contoured passageway within the block.

6. The apparatus as in claim 1 further characterized in that the contoured passageway in the block is shaped generally like an inverted T, is downwardly and upwardly tapered, and the extending member with diverging portion is asymmetrical.

7. In a wire rope sideframe conveyor having a center roller and wing rollers suspended between generally parallel wire ropes, the combination which includes:
   elongated connectors engaging the wire ropes,
   a block fixed to the top of each elongated connector,
   a contoured passageway in each block having an inwardly tapered lateral bore merging with a downwardly tapered longitudinal bore,
   an extending member having a straight portion fixed to the outer end of each wing roller shaft, a diverging portion on said extending member, said diverging portion adapted to closely sit within the lateral bore and within the longitudinal bore, the straight portion being longer than the diverging portion within the passageway, and a handle on said extending member whereby the diverging portion can be withdrawn from the passageway, turned and reseated in the passageway.

8. In a wire rope sideframe conveyor which includes, in combination, parallel wire ropes elongated connectors engaging said ropes, a center roller and wing rollers suspended between said ropes, an extending member having a straight limb with one end fixed to each wing roller shaft and the other end extending beyond each elongated connector, a diverging limb starting intermediate the ends and continuing into a handle, a block fixed to each elongated connector, a contoured passageway in the block, said passageway having a downwardly tapered longitudinal bore merging with an inwardly tapered lateral bore, the straight and diverging limbs adapted for seating in the passageway, the straight limb between the wing roller shaft and the block being longer than the length of the straight and diverging limbs within the passageway, whereby the wing rollers may be fixed in downstream, in upstream and in neutral position.

No references cited.